US006816932B2

(12) United States Patent
Cho et al.

(10) Patent No.: US 6,816,932 B2
(45) Date of Patent: Nov. 9, 2004

(54) BUS PRECHARGE DURING A PHASE OF A CLOCK SIGNAL TO ELIMINATE IDLE CLOCK CYCLE

(75) Inventors: James Y. Cho, Los Gatos, CA (US); Joseph B. Rowlands, Santa Clara, CA (US); Mark H. Pearce, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 595 days.

(21) Appl. No.: 09/858,778

(22) Filed: May 15, 2001

(65) Prior Publication Data

US 2002/0041633 A1 Apr. 11, 2002

Related U.S. Application Data

(63) Continuation-in-part of application No. 09/680,523, filed on Oct. 6, 2000, now Pat. No. 6,678,767.

(51) Int. Cl.$^7$ .......................... G06F 13/38; H03K 19/00
(52) U.S. Cl. ........................................ 710/100; 326/34
(58) Field of Search ................................ 710/100, 300, 710/305; 326/31, 33, 34, 86, 87, 90, 91; 365/203, 185.01, 185.18, 185.25, 233

(56) References Cited

U.S. PATENT DOCUMENTS

| | | | | | |
|---|---|---|---|---|---|
| 5,402,379 | A | * | 3/1995 | McClure | 365/203 |
| 5,646,556 | A | * | 7/1997 | Longwell et al. | 326/93 |
| 5,698,995 | A | * | 12/1997 | Usami | 326/93 |
| 5,901,097 | A | * | 5/1999 | Koshikawa | 365/203 |
| 5,919,265 | A | | 7/1999 | Nishtala et al. | |
| 6,078,546 | A | | 6/2000 | Lee | |
| 6,442,642 | B1 | | 8/2002 | Brooks | |
| 6,442,644 | B1 | | 8/2002 | Gustavson et al. | |
| 6,601,123 | B1 | * | 7/2003 | Zhang et al. | 710/305 |
| 6,643,792 | B1 | * | 11/2003 | Kurosawa | 713/501 |

OTHER PUBLICATIONS

Halfhill, "SiByte Reveals 64–Bit Core for NPUs," Microprocessor Report, Jun. 2000, pp. 45–48.
Pentium® Pro Family Developer's Manual, vol. 1: Specifications, Chapter 3, pp. 1–25, 1996.
"PowerPC 601; RISC Microprocessor User's Manual," IBM Microelectronics, Power PC, Motorola, Rev. 1, 1993, 8 pages.
SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB–1 CPU, Oct. 2000, rev. 0.1, 1 page.
SiByte, "Fact Sheet," SB–1250, Oct. 2000, rev. 0.2, 10 pages.
Stepanian, SiByte, SiByte SB–1 MIPS64 CPU Core, Embedded Processor Forum 2000, Jun. 13, 2000, 15 pages.
Jim Keller, "The Mercurian Processor: A High Performance, Power–Efficient CMP for Networking," Oct. 10, 2000, 22 pages.

* cited by examiner

Primary Examiner—Ilwoo Park
(74) Attorney, Agent, or Firm—Lawrence J. Merkel

(57) ABSTRACT

A system includes a bus and a circuit for precharging the bus. The circuit may be coupled to receive a clock signal associated with the bus, and may be configured to precharge a bus during an interval of the period of the clock signal, the interval being between a first edge (rising or falling) and the subsequent edge (falling or rising). A second interval within the period and excluding the interval may be used to perform a bus transfer. In this manner, both precharging and transfer may be performed in the same clock cycle. Bandwidth of the bus may be improved since transfers may occur each clock cycle, rather than having a non-transfer clock cycle for precharging.

21 Claims, 7 Drawing Sheets

BUS PRECHARGE DURING A PHASE OF A CLOCK SIGNAL TO ELIMINATE IDLE CLOCK CYCLE

This application is a continuation-in-part of U.S. patent application Ser. No. 09/680,523, filed Oct. 6, 2000, now U.S. Pat. No. 6,678,767.

BACKGROUND OF THE INVENTION

1. Field of the Invention

This invention is related to systems and, more particularly, to buses within digital systems.

2. Description of the Related Art

A bus is frequently used in digital systems to interconnect a variety of devices included in the digital system. Generally, one or more devices are connected to the bus, and use the bus to communicate with other devices connected to the bus. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

The bus is a shared resource among the agents, and thus may affect the performance of the agents to the extent that the bus may limit the amount of communication by each agent and the latency of that communication. Generally, a bus may be characterized by latency and bandwidth. The latency may be affected by the amount of time used to arbitrate for the bus and to perform a transaction on the bus. The bandwidth may be affected by the amount of information (e.g. bits or bytes) that may be transmitted per cycle, as well as the amount of time used to perform the transfer. Both latency and bandwidth may be affected by the physical constraints of the bus and the protocol employed by the bus. When a bus is shared by more than one agent to transfer information, a transient collision may occur between a first agent driving the bus in a clock cycle and a second agent driving the bus in an immediately subsequent clock cycle. During the transient collision, both agents are driving the same lines. In order to avoid this transient collision, either an agent must delay driving the bus during a clock cycle that it is allowed to drive the bus, or an idle clock cycle must be added when the bus is to be driven by a different agent than the agent currently driving the bus. Either solution may negatively impact the latency and/or bandwidth of the bus.

SUMMARY OF THE INVENTION

A system includes a bus and a circuit for precharging the bus. The circuit may be coupled to receive a clock signal associated with the bus, and may be configured to precharge a bus during an interval of the period of the clock signal, the interval being between a first edge (rising or falling) and the subsequent edge (falling or rising). A second interval within the period and excluding the interval may be used to perform a bus transfer. In this manner, both precharging and transfer may be performed in one clock cycle. Since the bus is driven only during the non-precharge period, the transient collision may be avoided without adding an idle cycle on the bus.

In one embodiment, the bus may employ differential pairs of lines for each signal. These differential pairs may be precharged and driven as mentioned above. Although the precharging occupies a portion of the clock cycle, the low signal swings allowed with the differential signalling may reduce the overall amount of time used to perform a transfer.

Broadly speaking, an apparatus is contemplated comprising a bus and a circuit coupled thereto. The bus includes at least one line. The circuit is further coupled to receive a clock signal for the bus, the clock signal having a rising edge and a falling edge during use. The circuit is configured to precharge the at least one line during at least a portion of a first interval of a period of the clock signal, the first interval being between an occurrence of a first edge of the rising edge or the falling edge and an occurrence of a second edge of the rising edge or the falling edge. A transfer occurs on the bus during a second interval of the period, wherein the second interval is exclusive of the first interval.

Additionally, a method is contemplated. At least one line of a bus is precharged during at least a portion of a first interval of a period of a clock signal for the bus. The clock signal has a rising edge and a falling edge during use. The first interval is between an occurrence of a first edge of the rising edge or the falling edge and an occurrence of a second edge of the rising edge or the falling edge. Transferring occurs on the bus during a second interval of the period, the second interval being exclusive of the first interval.

BRIEF DESCRIPTION OF THE DRAWINGS

Other objects and advantages of the invention will become apparent upon reading the following detailed description and upon reference to the accompanying drawings in which.

Figure 1:
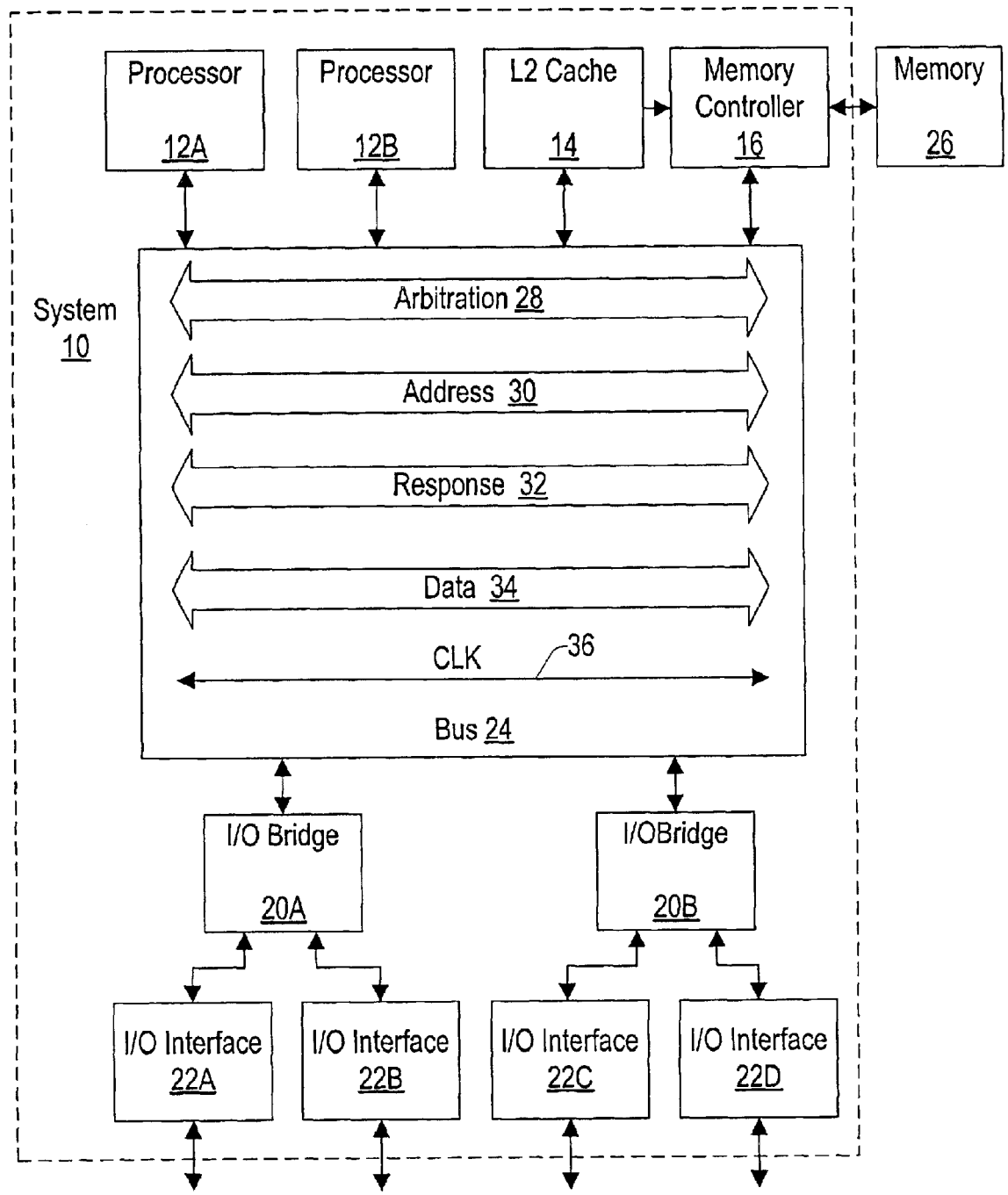
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. More particularly, as illustrated in FIG. 1, bus 24 may include arbitration lines 28, an address bus 30, response lines 32, a data bus 34, and a clock line or lines 36. As illustrated in FIG. 1, each of processors 12A–12B, L2 cache 14, memory controller 16, and I/O bridges 20A–20B are coupled to bus 24. Thus, each of processors 12A–12B, L2 cache 14, memory controller 16, and I/O bridges 20A–20B may be an agent on bus 24 for the illustrated embodiment. More particularly, each agent may be coupled to clock line(s) 36 and to the conductors within bus 24 that carry signals which that agent may sample and/or drive. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus 30 and data bus 34 are independently arbitrated for (using signals on arbitration lines 28). Each transaction including both address and data thus includes an arbitration for the address bus 30, an address phase on the address bus 30, an arbitration for the data bus 34, and a data phase on the data bus 34. Additionally, coherent transactions may include a response phase on response lines 32 for communicating coherency information after the address phase. Additional details regarding one embodiment of bus 24 are provided further below. The bus clock signal CLK on clock line(s) 36 defines the clock cycle for bus 24.

Bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be an outer level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for I/O bridge 20A and I/O interfaces 22C–22D for I/O bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that I/O interface 22A–22B.

Similarly, I/O bridge 20B generally performs transactions on bus 24 on behalf of I/O interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) I/O fabric developed by Advanced Micro Devices, Inc (e.g. I/O interface 22B). Other I/O interfaces may be bridged by I/O bridge 20B. Other implementations may bridge any combination of I/O interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

It is noted that system 10 (and more particularly processors 12A–12B, L2 cache 14, memory controller 16, I/O interfaces 22A–22D, I/O bridges 20A–20B and bus 24) may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice.

It is noted that, while FIG. 1 illustrates I/O interfaces 22A–22D coupled through I/O bridges 20A–20B to bus 24, other embodiments may include one or more I/O interfaces directly coupled to bus 24, if desired.

Figure 2:
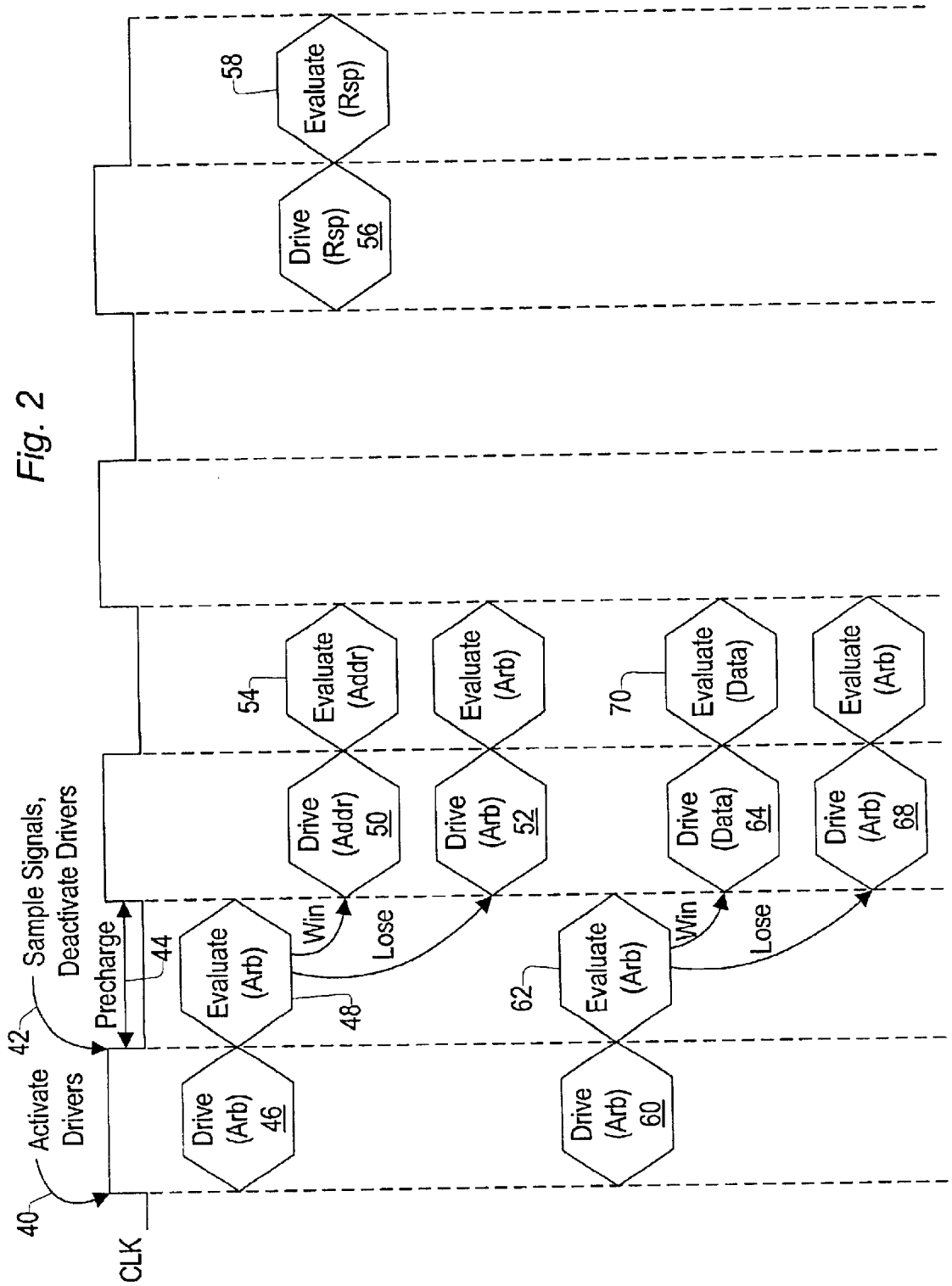
FIG. 2 is a timing diagram illustrating transmission of signals on one embodiment of a bus within the system shown in FIG. 1.

Turning next to FIG. 2, a timing diagram is shown illustrating transmission and sampling of signals according to one embodiment of system 10 and bus 24. Other embodiments are possible and contemplated. The clock signal on clock line(s) 36 is illustrated (CLK) in FIG. 2. The high and low portions of the clock signal CLK are delimited with vertical dashed lines.

Generally, the clock signal CLK may have a rising edge (the transition from a low value to a high value) and a falling edge (the transition from a high value to a low value). The signals on bus 24 may be driven responsive to one of the edges and sampled responsive to the other edge. For example, in the illustrated embodiment, signals may be driven responsive to the rising edge and sampled responsive to the falling edge. Thus, signals propagate on bus 24 during the time interval between the rising edge and the falling edge of the clock signal, and sampled signals may be evaluated between the falling edge and the rising edge of the clock signal. One or more signals on the bus may be driven with a value, and that value may be sampled by an agent receiving the signals.

During the interval between the falling and the rising edge of the clock signal CLK, one or more lines on bus 24 may be precharged (illustrated by arrow 44). For example, in one embodiment, bus 24 may employ differential pairs of lines for each signal. Each line may be precharged, and then one of the lines may be driven to indicate the bit of information transmitted on that line. For such embodiments, the signals may be precharged between the falling edge of the clock signal CLK and the next rising edge of the clock signal CLK. The agent driving the signal may disable its drivers responsive to the falling edge of the clock signal CLK. In one specific implementation, the agent driving the signal may disable its driver after a predetermined delay to avoid a race condition with the sampling of the signals. One of the agents may be defined to perform the precharge, or a separate circuit (e.g. FIGS. 3 and 4 below) may perform the precharge. Alternatively, the agent driving the signal may perform the precharge.

With a differential bus, each line may be precharged each clock cycle (or each clock cycle that a transfer occurs on the line), during an interval of the clock cycle. Thus, arbitration lines, address bus lines, data bus lines, and response lines may be precharged each clock cycle and may be prepared for transfer in the following clock cycle. Bandwidth may be increased through the elimination of idle clock cycles for precharging. Instead, a transfer occurs in one portion of the clock cycle and the precharging occurs during the other portion of the clock cycle.

While a differential bus is described above, one or more lines may be precharged even in a non-differential environment. For example, signals which may be driven by multiple sources concurrently (such as snoop response signals, in some bus protocols) may be precharged to one state and, if the other state is desired, the agents may drive the signal to the other state.

As illustrated by arrow 40, an agent which has determined that it will drive a signal or signals during a clock cycle may activate its driver for each such signal responsive to the rising edge of the clock signal. For example, an agent may logically AND the clock signal CLK with an internally generated signal indicating that a signal is to be driven to produce an enable signal for a driver on the signal (if the enable signal is asserted high). Other embodiments may employ other logic circuits to produce the enable, depending on whether the enable is asserted high or low and whether the internally generated signal is asserted high or low. Furthermore, the clock signal CLK may be logically ORed with a delayed version of the clock signal CLK to add hold time to avoid race conditions with the sampling of the signal at the falling edge of the clock signal CLK, as desired.

As illustrated by arrow 42, agents may sample signals responsive to the falling edge of the clock signal. For example, agents may employ a senseamp (e.g. for differential signalling), flip flop, register, latch, or other clocked device which receives the clock signal CLK and captures the signal on the line responsive to the falling edge of the clock signal CLK.

Since signals are driven responsive to one edge of the clock signal and sampled responsive to the other edge, the latency for performing a transaction may be reduced. Generally, the clock cycle may be divided into a drive phase and an evaluate phase. During the drive phase, signals are driven. Those driven signals are sampled at the end of the drive phase and, during the evaluate phase, those driven signals are evaluated to determine if the sampling agent is to perform an action with respect to the information transmitted.

For example, arbitration may be completed in one clock cycle, according to one embodiment. The request signals for each agent requesting the bus may be driven responsive to the rising edge, and sampled on the falling edge. During the remaining portion of the clock cycle, the request signals may be evaluated to determine a winner of the arbitration. The winner may drive the bus on the next rising edge. As illustrated in FIG. 2, address arbitration request signals may be driven (reference numeral 46) and evaluated (reference numeral 48) in the first illustrated clock cycle. The winning agent may drive an address portion of a transaction during the subsequent clock cycle (reference numeral 50). Other arbitrating agents may determine that they did not win, and thus may drive request signals again during the subsequent clock cycle (reference numeral 52).

Agents involved in coherency may sample the address driven by the winning agent (reference numeral 54). During the evaluate phase, the agents may determine if the transaction is a coherent transaction, and thus that the agents are to snoop the address. Additionally, the evaluate phase and the subsequent clock cycle may be used to determine the snoop result, which may be driven in the response phase (reference numeral 56) and evaluated by the agent driving the address (reference numeral 58).

Data bus arbitration may be similar, as illustrated by reference numerals 60–70. More particularly, data arbitration request signals may be driven (reference numeral 60) and evaluated (reference numeral 62) in the first illustrated clock cycle. Precharge of the arbitration signals may be performed during the interval between the falling edge and the rising edge of the clock cycle, as illustrated by arrow 44. The winning agent may drive a data portion of a transaction during the subsequent clock cycle (reference numeral 64). Agents which receive data may sample the data, and may evaluate the data (reference numeral 70). For example, in embodiments which provide tagging to allow for out of order data transfers, the tags may be compared to tags that the agent is awaiting data for to determine if the agent should capture the data. Other arbitrating agents may determine that they did not win, and thus may drive request signals again during the subsequent clock cycle (reference numeral 68).

As used herein, the term "drive", when referring to a signal, refers to activating circuitry which changes the voltage on the line carrying the signal, to thereby transmit a bit of information. The term "sample", when referring to a signal, refers to sensing the voltage on the line carrying the signal to determine the bit of information conveyed on the signal. A transfer on a line or signal refers to driving the line and sampling the line. The term "precharge" refers to setting the voltage on a line to a predetermined value prior to the time that the line may be driven. The predetermined value may be a supply (high) voltage or a ground (low) voltage, for example. The "period" of a clock cycle is defined as the time elapsing between two consecutive rising (or falling) edges of the clock signal.

While the above discussion illustrated an example in which signals are driven responsive to the rising edge of the clock signal CLK and sampled responsive to the falling edge, and in which precharging is performed in an interval between the falling edge and the rising edge; an alternative embodiment is contemplated in which signals may be driven responsive to the falling edge and sampled responsive to the rising edge, and in which precharging is performed in an interval between the rising edge and the falling edge.

Figure 3:
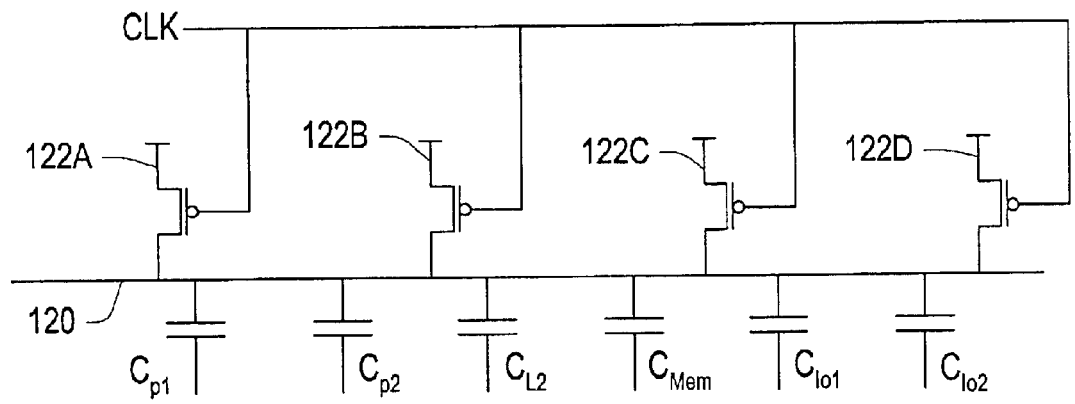
FIG. 3 is a circuit diagram of one embodiment of a precharge circuit for the bus of FIG. 1.

Turning next to FIG. 3, a circuit diagram illustrating one embodiment of a precharge circuit for bus 24 is shown. Other embodiments are possible and contemplated. Illustrated in FIG. 3 is a line 120, which may be one of a differential pair of lines corresponding to a signal on bus 24 or may be a line carrying a non-differential signal of bus 24. The precharge circuit shown in FIG. 3 includes transistors 122A–122D, each coupled between a power supply and the line 120 and having a gate terminal coupled to receive the clock signal.

Each of the agents shown in FIG. 1 may be coupled to the line 120, presenting a capacitive load on the line 120 at the point that the agent is coupled to the line. The capacitors $C_{p1}$, $C_{p2}$, $C_{L2}$, $C_{Mem}$, $C_{Io1}$, and $C_{Io2}$ are illustrated corresponding to the processor 12A, processor 12B, L2 cache 14, memory controller 16, I/O bridge 20A, and I/O bridge 20B, respectively. The number and type of agent may be varied from embodiment to embodiment, and each may present a capacitive load which may differ or be the same as the other loads, depending upon implementation, etc.

The transistors 122A–122D may precharge the line 120 during the interval between the falling edge and the rising edge of the clock signal CLK (e.g. while the clock signal CLK is low). The transistors may be located at various locations along the line 120 to provide for a rapid precharge even though line 120 may be heavily loaded, in some cases. The number of transistors 122A–122D included in the precharge circuit may be dependent on the load, and the size of the transistors may be dependent on the load as well. Additionally, the transistors 122A–122D may vary in size from each other dependent on the distribution of the load on the line.

By distributing the transistors along the line 120, various points along the line may see a relatively even precharge (e.g. the voltage on the line 120 may rise at a relatively even rate along the line, although variations will exist dependent on the actual load, size of the transistors 122A–122D, etc.).

It is noted that, while the circuit in FIG. 3 (and FIG. 4 below) illustrate transistors 122A–122D which precharge to a supply (high) voltage, other embodiments may precharge to a low voltage. For example, transistors 122A–122D may be P-type Metal-Oxide-Semiconductor (PMOS) transistors. N-type MOS (NMOS) transistors could instead be used, coupled between the line 120 and ground, to precharge to a ground (low) voltage (and coupled to an inverse of the clock signal CLK to provide precharging during the low portion of the clock signal CLK).

Figure 4:
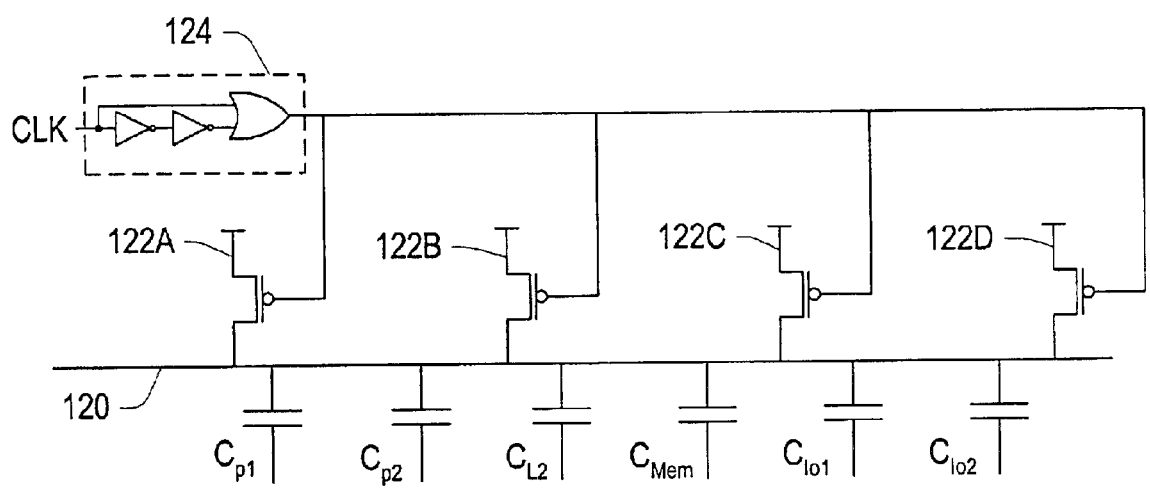
FIG. 4 is a circuit diagram of a second embodiment of a precharge circuit for the bus of FIG. 1.

It is noted that the circuits in FIGS. 3 and 4 precharge during the low portion of the clock signal CLK. Other embodiments may precharge during the high portion of the clock signal CLK. Such circuits could include an inverter or inverters between the clock signal CLK and the gate terminals of transistors 122A–122D.

It is noted that the precharge circuit illustrated in FIG. 3 includes multiple transistors on line 120. Other embodiments may include only one transistor, or two or more transistors, according to design choice. Furthermore, circuitry similar to that shown in FIG. 3 may be employed on each line of bus 24 which requires precharging (e.g. all the lines, in differential embodiments, or only certain lines in other embodiments).

While the circuit of FIG. 3 precharges during the entire low portion of the clock signal CLK, other embodiments may delay the start of the precharge from the falling edge of the clock signal CLK or end the precharge before the rising edge of the clock signal CLK. Delaying the start of the precharge may allow for increased hold time from the falling edge of the signal for the receiving agent. Ending the precharge before the rising edge of the clock signal may enhance the separation between the operation of transistors 122A–122D and the drivers in the agents (which may begin driving in response to the rising edge). The rising and falling edges may be reversed in this paragraph, as mentioned above.

FIG. 4 illustrates a precharge circuit which delays that start of precharge. FIG. 4 may be similar to FIG. 3 in general, but includes a circuit 124 between the clock signal CLK and the gate terminals of transistors 122A–122D. Circuit 124 delays the falling edge of the signal on the gate terminals of transistors 122A–122D by delaying the clock signal CLK through the inverters within circuit 124 and then ORing the delayed signal with the original signal. This has the effect of delaying the falling edge on the output of circuit 124 (with respect to clock signal CLK) while leaving the rising edge relatively in place. Using an AND circuit on the output allows for delaying of the rising edge while leaving the falling edge relatively in place.

Figure 5:
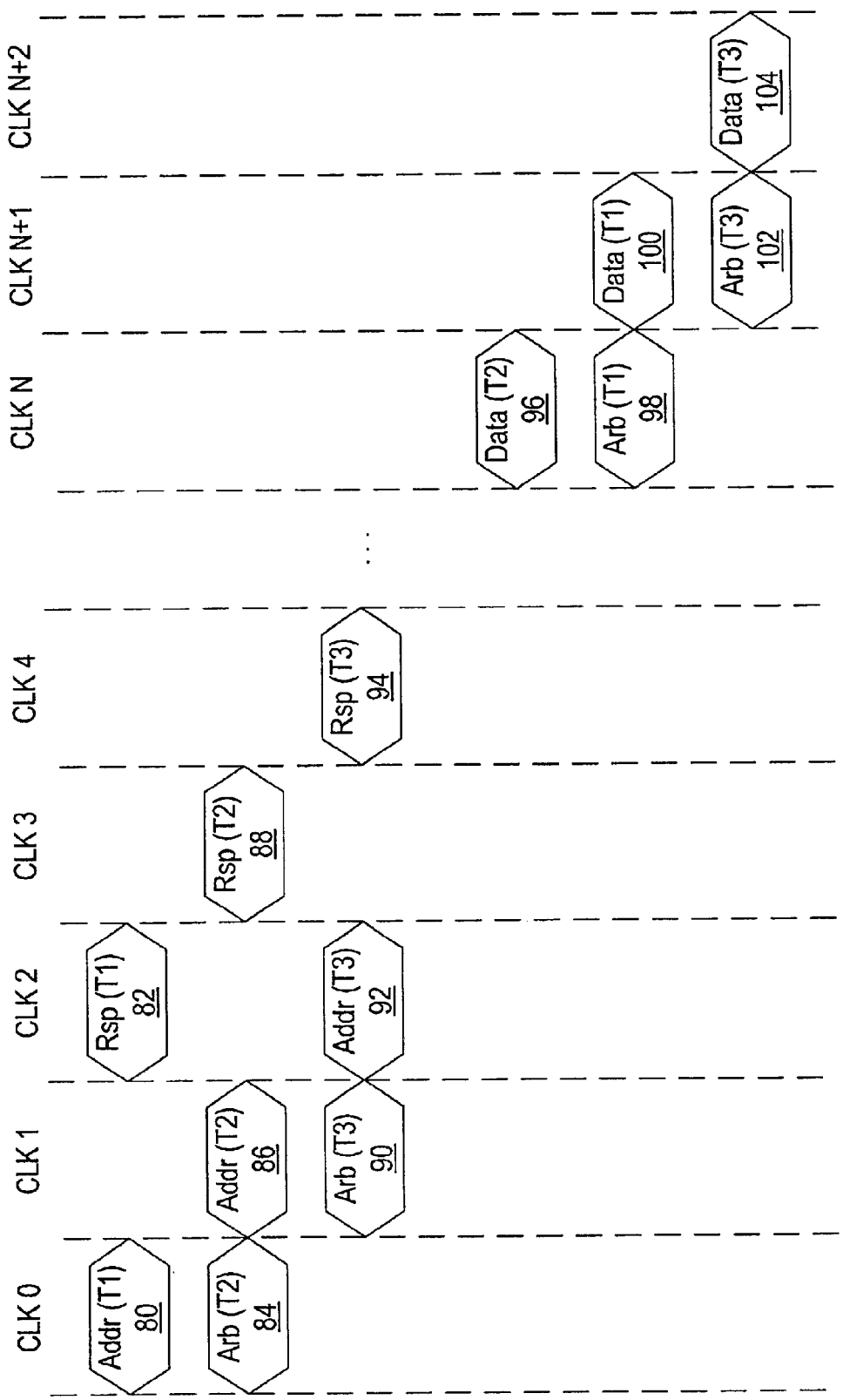
FIG. 5 is a timing diagram illustrating several exemplary bus transactions.

Turning next to FIG. 5, a timing diagram is shown illustrating several exemplary transactions which may be performed on one embodiment of bus 24. Other embodiments are possible and contemplated. In FIG. 5, clock cycles are delimited by vertical dashed lines and labeled (CLK 0, CLK 1, etc.) at the top.

FIG. 5 illustrates pipelining on the bus according to one embodiment of the bus. During clock cycle CLK 0, the address phase of a first transaction (T1) is occurring on the address bus (reference numeral 80). The response phase for the first transaction occurs in clock cycle CLK 2 (reference numeral 82). In parallel with the address phase of the first transaction, during clock cycle CLK 0, arbitration for the address bus is occurring and an agent wins the arbitration to perform a second transaction (T2) (reference numeral 84). The corresponding address phase occurs in clock cycle CLK 1 (reference numeral 86) and the response phase occurs in clock cycle CLK 3 (reference numeral 88). In parallel with the address phase of the second transaction during clock cycle CLK 1, arbitration for the address bus is occurring and an agent wins the arbitration to perform a third transaction (T3) (reference numeral 90). The corresponding address phase occurs in clock cycle CLK 2 (reference numeral 92) and the response phase occurs in clock cycle CLK 4 (reference numeral 94).

Data phases for the transactions are illustrated in clock cycles CLK N, CLK N+1, and CLK N+2. More particularly, the data phase for the second transaction is occurring during clock cycle CLK N (reference numeral 96). In parallel during clock cycle CLK N, an arbitration for the data bus is occurring and an agent wins to perform the data phase of the first transaction (reference numeral 98). The corresponding data phase occurs in clock cycle CLK N+1 (reference numeral 100). In parallel during clock cycle CLK N+1, an arbitration for the data bus is occurring and an agent wins to perform the data phase of the third transaction (reference numeral 102). The corresponding data phase occurs in clock cycle CLK N+2 (reference numeral 104).

Thus, the address arbitration, address phase, response phase, data arbitration, and data phase of various transactions may be pipelined. Accordingly, a new transaction may be initiated each clock cycle, providing high bandwidth. Furthermore, in one embodiment, the data bus width is as wide as the largest data transfer which may occur in response to a single transaction (e.g. a cache block wide, in one embodiment). Therefore, data transfers may occur in a single clock cycle in such an embodiment, again allowing for high bandwidth of one new transaction each clock cycle. Other embodiments may employ a narrower data bus, and may allow address transfers to last more than one clock cycle.

It is noted that, while the data phases of the transactions in FIG. 5 are illustrated at a later time than the address phases, the data phases may overlap with the address phases. In one embodiment, the data phase of a given transaction may begin at any time after the address phase.

FIG. 5 also illustrates the out of order features of one embodiment of bus 24. While the address phases of the three transactions occur in a first order (T1, then T2, then T3), the data phases occur in a different order (T2, then T1, then T3 in this example). By allowing out of order data phases with respect to the order of the corresponding address phases, bandwidth utilization may be high. Each responding agent may arbitrate for the data bus once it has determined that the data is ready to be transferred. Accordingly, other agents (e.g. lower latency agents) may transfer data for later transactions out of order, utilizing bandwidth while the higher latency, but earlier initiated, transaction experiences its latency. Generally, any two transactions may have their data phases performed out of order with their address phases, regardless of whether the two transactions are initiated by the same requesting agent or different requesting agents.

In one embodiment, bus 24 may include tagging for identifying corresponding address phases and data phases. The address phase includes a tag assigned by the requesting agent, and the responding agent may transmit the same tag in the data phase. Thus, the address and data phases may be linked. In one embodiment, the tag assigned to a given transaction may be freed upon transmission of the data, so that the tag may be rapidly reused for subsequent transaction. Queues in the agents receiving data from bus 24 may be designed to capture data using a given tag once per queue entry, to ensure that a reused tag does not overwrite valid data from a previous transaction.

FIG. 5 further illustrates the coherency features of one embodiment of bus 24. Coherency may be maintained using signals transmitted during the response phase of each transaction. The response phase may be fixed in time with respect to the corresponding address phase, and may be the point at which ownership of the data affected by the transaction is transferred. Accordingly, even though the data phases may be performed out of order (even if the transactions are to the same address), the coherency may be established based on the order of the address phases. In the illustrated embodiment, the response phase is two clock cycles of the CLK clock after the corresponding address phase. However, other embodiments may make the fixed interval longer or shorter.

Figure 6:
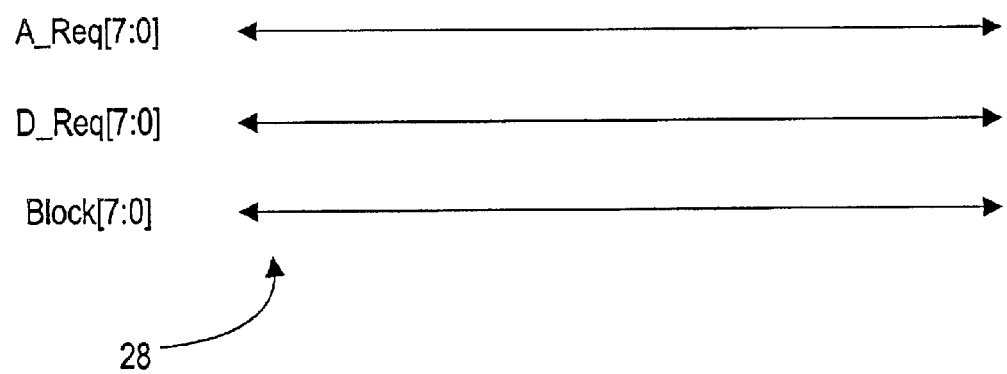
FIG. 6 is a block diagram illustrating exemplary signals which may be included in one embodiment of an arbitration portion of a bus.

Turning next to FIG. 6, a block diagram is shown illustrating exemplary signals which may be included on one embodiment of arbitration lines 28. Other embodiments are possible and contemplated. In the embodiment of FIG. 6, a set of address request signals (A_Req[7:0]) and a set of data request signals (D_Req[7:0]) are included. Additionally, a set of block signals (Block[7:0]) may be included.

The address request signals may be used by each requesting agent to arbitrate for the address bus. Each requesting agent may be assigned one of the address request signals, and that requesting agent may assert its address request signal to arbitrate for the address bus. In the illustrated embodiment, bus 24 may include a distributed arbitration scheme in which each requesting agent may include or be coupled to an arbiter circuit. The arbiter circuit may receive the address request signals, determine if the requesting agent wins the arbitration based on any suitable arbitration scheme, and indicate a grant or lack thereof to the requesting agent. In one embodiment, each arbiter circuit may track the relative priority of other agents to the requesting agent, and may update the priority based on the winning agent (as indicated by an agent identifier portion of the tag transmitted during the address phase).

The data request signals may be used by each responding agent to arbitrate for the data bus. Each responding agent may be assigned one of the data request signals, and that responding agent may assert its data request signal to arbitrate for the data bus. In the illustrated embodiment, bus 24 may include a distributed arbitration scheme in which each responding agent may include or be coupled to an arbiter circuit. The arbiter circuit may receive the data request signals, determine if the responding agent wins the arbitration based on any suitable arbitration scheme, and indicate a grant or lack thereof to the responding agent. In one embodiment, each arbiter circuit may track the relative priority of other agents to the responding agent, and may update the priority based on the winning agent (as indicated by an agent identifier transmitted during the data phase).

The block signals may be used by agents to indicate a lack of ability to participate in any new transactions (e.g. due to queue fullness within that agent). If an agent cannot accept new transactions, it may assert its block signal. Requesting agents may receive the block signals, and may inhibit initiating a transaction in which that agent participates responsive to the block signal. A transaction in which that agent does not participate may be initiated.

Other embodiments may employ a centralized arbitration scheme. Such an embodiment may include address grant signals for each requesting agent and data grant signals for each responding agent, to be asserted by the central arbiter to the winning agent to indicate grant of the bus to that requesting or responding agent.

Figure 7:
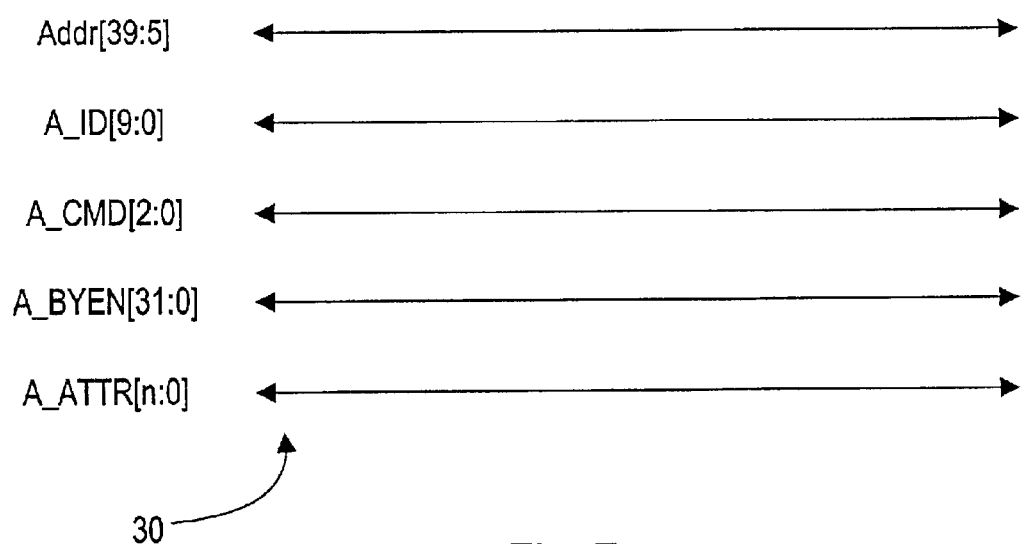
FIG. 7 is a block diagram illustrating exemplary signals which may be included in one embodiment of an address bus.

Turning next to FIG. 7, a block diagram illustrating exemplary signals which may be included on address bus 30 is shown. Other embodiments are possible and contemplated. In the illustrated embodiment, address bus 30 includes address lines used to provide the address of the transaction (Addr[39:5]) and a set of byte enables (A_BYEN[31:0]) indicating which bytes on the data bus 34 are being read or written during the transaction, a command ($A_{13}$CMD[2:0]) used to indicate the transaction to be performed (read, write, etc.), a transaction ID (A_ID[9:0]) used to identify the transaction, and a set of attributes ($A_{13}$ATTR[n:0]).

The transaction ID may be used to link the address and data phases of the transaction. More particularly, the responding agent may use the value provided on the transaction ID as the transaction ID for the data phase. Accordingly, the transaction ID may be a tag for the transaction. A portion of the transaction ID is an agent identifier identifying the requesting agent. For example, the agent identifier may be bits 9:6 of the transaction ID. Each agent is assigned a different agent identifier.

The set of attributes may include any set of additional attributes that it may be desirable to transmit in the address phase. For example, the attributes may include a cacheability indicator indicating whether or not the transaction is cacheable within the requesting agent, a coherency indicator indicating whether or not the transaction is to be performed coherently, and a cacheability indicator for L2 cache 14. Other embodiments may employ more, fewer, or other attributes, as desired.

Figure 8:
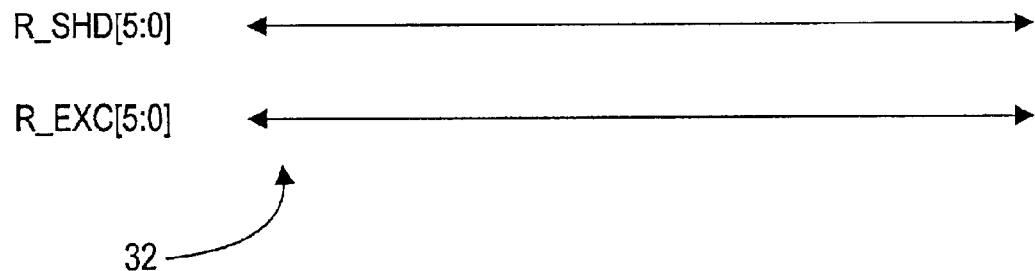
FIG. 8 is a block diagram illustrating exemplary signals which may be included in one embodiment of an response portion of a bus.

Turning next to FIG. 8, a block diagram illustrating exemplary signals which may be employed on one embodiment of response lines 32 is shown. Other embodiments are possible and contemplated. In the embodiment of FIG. 8, response lines 32 include a set of shared signals (R_SHD[5:0]) and a set of exclusive signals (R_EXC[5:0]). Each agent which participates in coherency may be assigned a corresponding one of the set of shared signals and a corresponding one of the set of exclusive signals. The agent may report shared ownership of the data affected by a transaction by asserting its shared signal. The agent may report exclusive ownership of the data affected by a transaction by asserting its exclusive signal. The agent may report no ownership of the data by not asserting other signal. In the illustrated embodiment, modified ownership is treated as exclusive. Other embodiments may employ a modified signal (or an encoding of signals) to indicate modified.

Figure 9:
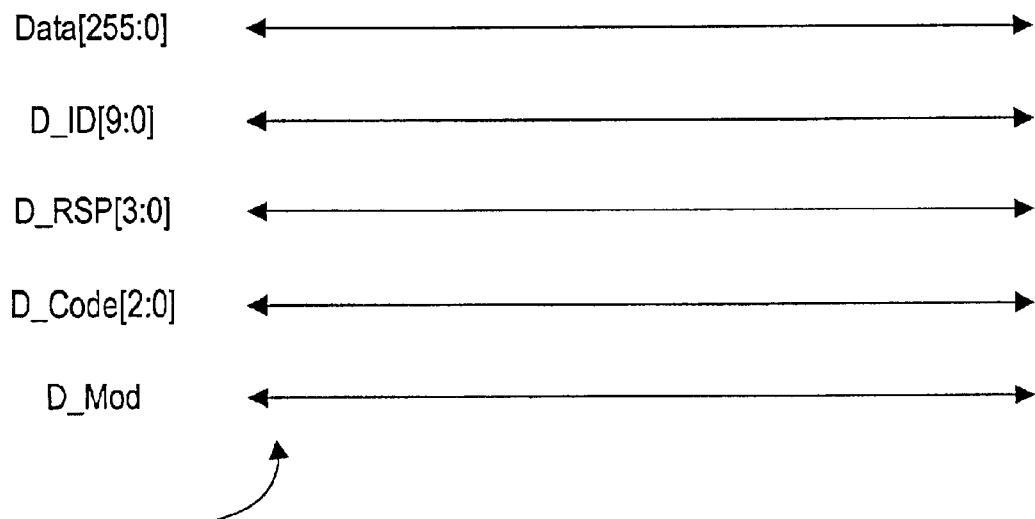
FIG. 9 is a block diagram illustrating exemplary signals which may be included in one embodiment of a data bus.

Turning next to FIG. 9, a block diagram illustrating exemplary signals which may be employed on one embodiment of data bus 34 is shown. Other embodiments are possible and contemplated. In the embodiment of FIG. 9, data bus 34 includes data lines (Data[255:0]) used to transfer the data, a transaction ID (D_ID[9:0]) similar to the transaction ID of the address phase and used to match the address phase with the corresponding data phase, a responder ID (D_RSP[3:0]), a data code (D_Code[2:0]), and a modified signal (D_Mod).

The responder ID is the agent identifier of the responding agent who arbitrated for the data bus to perform the data transfer, and may be used by the data bus arbiter circuits to update arbitration priority state (i.e. the responder ID may be an indication of the data bus arbitration winner). The data code may be used to report various errors with the transaction (e.g. single or double bit error checking and correction (ECC) errors, for embodiments employing ECC, unrecognized addresses, etc.). The modified signal (D_Mod) may be used to indicate, if an agent reported exclusive status, whether or not the data was modified. In one embodiment, an agent which reports exclusive status supplies the data, and the modified indication along with the data.

It is noted that, while various bit ranges for signals are illustrated in FIGS. 6–9, the bit ranges may be varied in other embodiments. The number of request signals, the size of the agent identifier and transaction ID, the size of the address bus, the size of the data bus, etc., may all be varied according to design choice.

Figure 10:
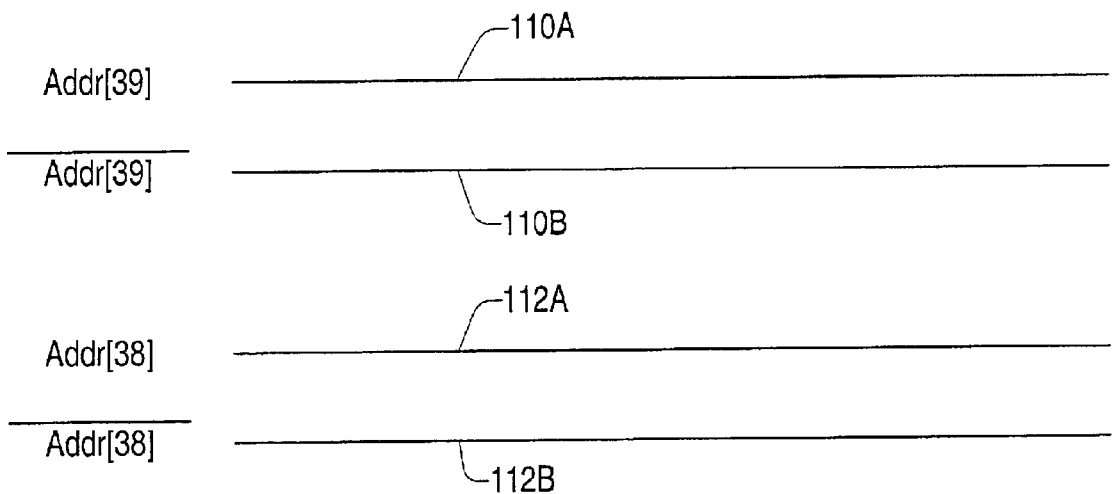
FIG. 10 is a block diagram illustrating differential pairs of signals which may be used in one embodiment of a bus.

Turning next to FIG. 10, a block diagram is shown illustrating differential pairs of signals which may be used according to one embodiment of bus 24. Other embodiments are possible and contemplated. Two bits of the address lines (Addr[39] and Addr[38]) are shown in FIG. 8. Each signal on bus 24 may be differential, in one embodiment. Other embodiments may use differential pairs for any subset of the signals on bus 24, or no signals may be differential pairs.

In the illustrated example, differential pair of lines 110A and 110B are used to transmit Addr[39] and differential pair of lines 112A and 112B are used to transmit Addr[38]. Lines 110A–110B will be discussed, and lines 112A–112B may be used similarly (as well as other differential pairs corresponding to other signals).

Lines 110A–110B may be precharged during the precharge time illustrated in FIG. 2 (e.g. using the circuits shown in FIGS. 3 and 4). For example. Lines 110A–110B may be precharged to a high voltage. One of lines 110A–110B may be driven low based on the value of Addr[39] desired by the driving agent. If Addr[39] is to transmit a logical one, line 110A may be driven low. If Addr[39] is to transmit a logical zero, line 110B may be driven low. Receiving agents may detect the difference between lines 110A–110B to determine the value driven on Addr[39] for the transaction. Alternatively, lines 110A–110B may be precharged to a low voltage and one of the lines 110A–110B may be driven high based on the value of Addr[39] desired by the driving agent.

Figure 11:
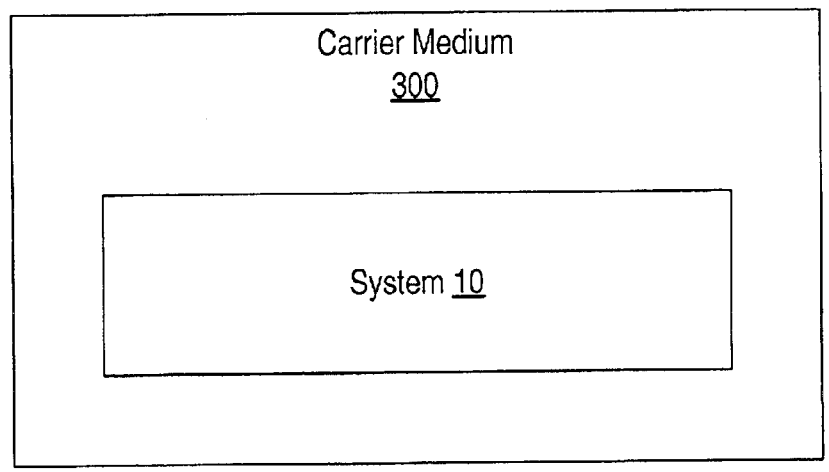
FIG. 11 is a block diagram of a carrier medium.

Turning next to FIG. 11, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any set of one or more agents (e.g. processors, L2 cache, memory controller, etc.) or circuitry therein (e.g. arbiters, etc.), precharge circuits, bus 24, etc.

Numerous variations and modifications will become apparent to those skilled in the art once the above disclosure is fully appreciated. It is intended that the following claims be interpreted to embrace all such variations and modifications.

What is claimed is:

1. An apparatus comprising:

a bus, including at least one line, to couple a plurality of devices to transfer a value on the bus between the devices by having the devices arbitrate for the bus; and a circuit coupled to the bus to receive a clock signal for the bus, the clock signal having a rising edge and a falling edge during use, wherein the circuit is configured to precharge the at least one line during at least a portion of a first interval of the clock signal, the first interval being between an occurrence of a first edge, the first edge being one of the rising edge or the falling edge, and an occurrence of a second edge, the second edge being the other one of the rising edge or the falling edge, and wherein the bus is driven to transfer the value during a second interval of the clock signal, and in which the circuit having precharge points along the at least one line to perform rapid precharge of the plurality of devices distributed along the bus.

2. The apparatus as recited in claim 1 wherein the first edge is the rising edge and the second edge is the falling edge.

3. The apparatus as recited in claim 1 wherein the first edge is the falling edge and the second edge is the rising edge.

4. The apparatus as recited in claim 1 wherein the circuit comprises transistors distributed along the length of the at least one line at the precharge points and wherein the transistors are to be activated to precharge the at least one line.

5. The apparatus as recited in claim 4 wherein a gate terminal of each of the transistors is coupled to receive the clock signal.

6. The apparatus as recited in claim 4 wherein a gate terminal of each of the transistors is coupled to receive a signal generated by a second circuit responsive to the clock signal.

7. The apparatus as recited in claim 4 wherein the transistors are PMOS transistors.

8. The apparatus as recited in claim 1 wherein the circuit precharges the at least one line to a high voltage.

9. The apparatus as recited in claim 1 wherein the circuit precharges the at least one line to a low voltage.

10. The apparatus as recited in claim 1 wherein the at least one line is one of a differential pair of lines corresponding to a signal on the bus.

11. The apparatus as recited in claim 1 wherein the bus comprises an address bus and a data bus.

12. The apparatus as recited in claim 11 wherein the bus further comprises response lines carrying signals for maintaining coherency in response to transactions on the bus.

13. The apparatus as recited in claim 11 wherein the bus further comprises arbitration lines.

14. The apparatus as recited in claim 1 wherein the clock signal defines a clock cycle, and wherein the second interval occurs earlier in the clock cycle than the first interval.

15. A method comprising:

precharging at least one line of a bus used to couple a plurality of devices to transfer a value on the bus between the devices in which the devices arbitrate for the bus, wherein the precharging to occur during at least a portion of a first interval a clock signal for the bus, the clock signal having a rising edge and a falling edge during use, the first interval being between an occurrence of a first edge, the first edge being one of the rising edge or the falling edge, and an occurrence of a second edge, the second edge being the other of the rising edge or the falling edge, and wherein the precharging to occur at a plurality of precharging points distributed along the at least one line to perform rapid precharging of the plurality of devices distributed along the bus; and transferring the value on the bus during a second interval of the clock signal, when a particular device wins arbitration of the bus.

16. The method as recited in claim 15 wherein the first edge is the rising edge and the second edge is the falling edge.

17. The method as recited in claim 15 wherein the first edge is the falling edge and the second edge is the rising edge.

18. The method as recited in claim 15 wherein the precharging comprises precharging the at least one line to a high voltage.

19. The method as recited in claim 15 wherein the precharging comprises precharging the at least one line to a low voltage.

20. The method as recited in claim 15 wherein the at least one line is one of a differential pair of lines corresponding to a signal on the bus.

21. The method as recited in claim 15 wherein the clock signal defines a clock cycle, and wherein the second interval occurs earlier in the clock cycle than the first interval.

* * * * *